Sept. 20, 1971    M. McCLENNAN    3,606,560

DRILL

Original Filed May 15, 1968

INVENTOR.
MORTON McCLENNAN
BY
Yount, Flynn & Tarolli
ATTORNEYS

United States Patent Office 3,606,560
Patented Sept. 20, 1971

3,606,560
DRILL
Morton McClennan, 17259 Chillicothe Road,
Chagrin Falls, Ohio 44022
Continuation of application Ser. No. 729,232, May 15,
1968. This application July 1, 1970, Ser. No. 56,101
Int. Cl. B23b 51/06
U.S. Cl. 408—59                                           4 Claims

ABSTRACT OF THE DISCLOSURE

An improved drill includes a body having a first passage therethrough for conducting fluid and an extruded tungsten carbide cutting tip having a second passage therethrough forming a continuation of the first passage. The second passage has a cross-sectional area which is no greater than the cross-sectional area of the first passage and which is more than one and a half times as great as the area of a circle having a diameter equal to the width of the cross section of the second passage.

---

This application is a streamlined-continuation application of application Ser. No. 729,232, filed May 15, 1968 and now abandoned.

Many gun drills have fluted cutting tips with passages drilled therethrough for delivering cutting fluid to a leading end of the drill to carry away chips and to cool and lubricate the drill. Due to the fluted configuration of the cutting tip and the necessity of having a strong cutting tip after removing sufficient material to form both the passage and the flute, the diameter of the passage drill through the cutting tip is necessarily limited. The limited diameter of the passage through the cutting tip makes it difficult to provide a sufficient flow of fluid to carry away the chips and to adequately cool and lubricate the gun drill. Accordingly, it is an object of this invention to provide an easily fabricated drill having a strong extruded cutting tip of a relatively hard material with a relatively large passage for conducting cutting fluid.

Another object of this invention is to provide an extruded tungsten carbide drill tip having a passage with a noncircular cross section therethrough.

Another object of this invention is to provide a drill including an extruded cutting tip having a passage with a cross-sectional area which is more than one and a half times as great as the area of a circle having a diameter equal to the cross-sectional width of the passage.

Another object of this invention is to provide a method for fabricating a drill including the steps of extruding a cutting tip and simultaneously therewith forming a passage for conducting fluid to a leading end of the cutting tip.

These and other objects and features of the invention will become more apparent upon a reading of the following description taken in connection with the accompanying drawings wherein.

The present invention relates to a drill having an extruded cutting tip with a passage for conducting cutting fluid to a leading end of the drill. In order to provide the cutting tip with thick strong walls and a passage having a relatively large fluid conducting capacity, the passage has a cross-sectional configuration which is noncircular and generally similar to the cross-sectional configuration of the cutting tip.

Figure 1:
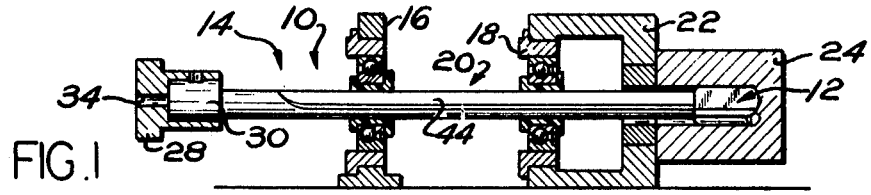
FIG. 1 is a schematic fragmentary sectional view of a drilling machine for forming a hole in a workpiece with a gun drill constructed in accordance with the present invention.
Figure 2:
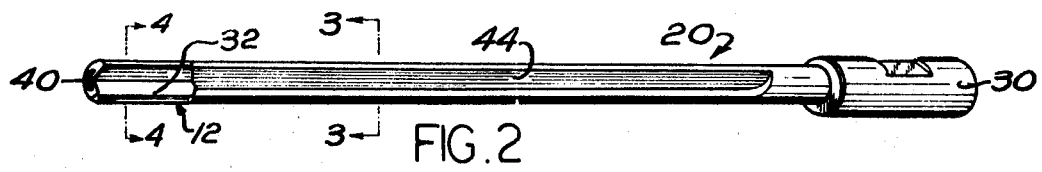
FIG. 2 is an enlarged perspective view of the gun drill of FIG. 1.

Although cutting tips constructed in accordance with the present invention are particularly well adapted for use in gun drills, they can be used in many different types of drills, such as oil-hole drills and oil-groove drills. An illustrative gun drill 10 having a cutting tip 12 constructed in accordance with the present invention is shown in FIG. 1 in a drilling machine 14. The drilling machine 14 includes guide assemblies 16 and 18 which engage a body 20 of the gun drill to position the gun drill relative to a chip box 22 and a workpiece 24. The gun drill 10 is rotated by a horizontal drill spindle 28 having a chuck for receiving a shank end 30 of the gun drill. Of course, rotation of the gun drill 10 causes a cutting edge 32 (FIG. 2) on the tip 12 to cut or drill a hole, in a known manner, in a workpiece 24. Since the gun drill 10 can be used with many different drilling machines and since the cooperation between the gun drill and guide assembly 16 and 18 is set forth in greater detail in U.S. Pat. No. 3,361,014, it is believed that further discussion of the drilling machine and guide assemblies is not necessary at this time.

Figures 3, 4:
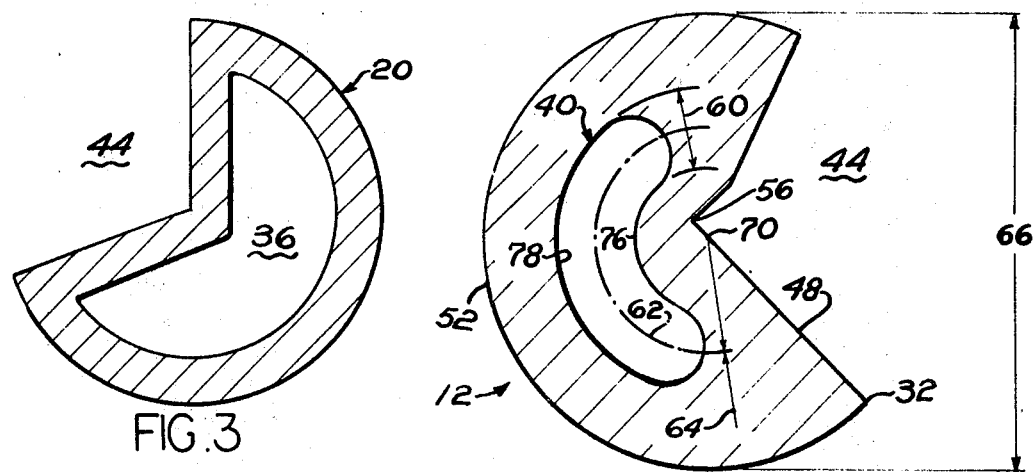
FIG. 3 is an enlarged sectional view, taken along the line 3—3 of FIG. 2, illustrating the structure of the body of the gun drill.
FIG. 4 is an enlarged sectional view, taken along the line 4—4 of FIG. 2, illustrating the structure of the cutting tip of the gun drill.

During rotation of the gun drill 10, the cutting tip 12 cuts chips or pieces from the workpiece 24. This cutting action subjects the cutting tip 12 to substantial forces due to interference between the cutting tip and the workpiece 24 and interference between the cutting tip and chips cut from the workpiece. In addition, the cutting tip 12 is subjected to heat generated as a result of friction between the drill and the workpiece 24. To alleviate these adverse operating conditions, cutting fluid is forced under pressure through a passage 34 in the drill spindle 28, a passage 36 in the body 20 and a passage 40 in the cutting tip 12, to the leading end of the cutting tip (see FIGS. 2 and 4) to carry away chips and to cool and lubricate the cutting tip 12. This cutting fluid washes the chips out of a hole formed in the workpiece by flowing away from the leading end of the cutting tip 12 along a continuous flute 44 formed in the body section 20 and the cutting tip. The cutting edge 32 is formed at the intersection between a radially outer end of a wall 48 defining the flute 44 in the cutting tip and a curved arcuate outer side wall 52 of the cutting tip 12 (see FIG. 4).

In accordance with the present invention, the passage 40 through the cutting tip 12 has a relatively large cross-sectional area to provide a sufficient flow of fluid to carry away a relatively large number of chips during a given time period and to adequately cool and lubricate the leading end of the cutting tip. In order to provide the cutting tip 12 with strong walls capable of withstanding substantial cutting forces, the passage 40 has a generally kidney shaped cross-sectional configuration which is generally similar to the cross-sectional configuration of the cutting tip. If the passage 40 was formed with a generally circular cross-sectional configuration, as has frequently been done heretofore, the diameter of the circular passage would have to be relatively large to provide a cross-sectional area and fluid conducting capacity equal to the cross-sectional area and fluid conducting capacity of the passage 40. Such a circular passage would, due to its large diameter, closely approach the outer surface 52 of the cutting tip and the peak 56 formed in a radially innermost portion of the flute 44. Such a passage construction results in a cutting tip having relatively thin side walls which are incapable of withstanding substantial cutting forces.

Since the cross-sectional configuration of the passage 40 is generally similar to the cross-sectional configuration of the cutting tip 12, the passage 40 can have a relatively large cross-sectional area without closely approaching the outer surface 52 and flute peak 56. This relatively large area of the passage 40, that is a cross-sectional area which is at least one and a half times as great as the cross-sectional area of a circle having a diameter corresponding to the width (indicated at 60) of the passage 40, allows cutting fluid to flow at a relatively high rate to the leading end of the cutting tip 12 without weakening the side walls of the cutting tip. Of course, the cross-sectional area of the passage 36 in the body 20 is at least as great as the cross-sectional area of the passage 40 so that the passage 36 does not effectively restrict the flow of cutting fluid before the cutting fluid reaches the passage 40 and cutting tip 12.

By experimentation it has been found that the strength of the cutting tip is maximized by forming the passage 40 along an arcuate longitudinal centerline 62 located in a cross-sectional centerline plane. The centerline 62 is located at a radial distance (indicated at 64 in FIG. 4) of approximately one-fourth of a maximum transverse dimension or diameter 66 from an imaginary geometrical center 70 of a circle formed by extending the surface 52. It has also been found that the flow of fluid through the passage 40 is maximized with a minimum effect on the strength of the cutting tip 12 if the passage 40 has a cross-sectional width, indicated at 60 in FIG. 4, which is no less than eight percent of the dimension 66 and no more than forty percent of this dimension. Of course, these limits will vary with variations in the cross-sectional configuration of the flute 44 and the cross-sectional configuration of the passage 40. An adequate flow of fluid is obtained through the gun drill for cutting most materials if the side surfaces 76 and 78 of the passage 40 have an arcuate extent of from 50 to 110 degrees relative to the center 70.

Figure 5:
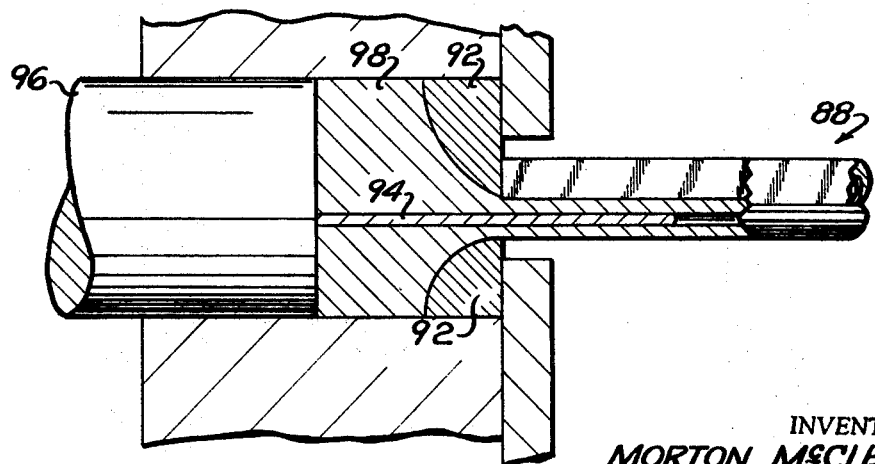
FIG. 5 is a schematic illustration of the formation of an extrusion having a cross-sectional configuration conforming to the cross-sectional configuration of the cutting tip of FIG. 4.

The cutting tip 12 is readily fabricated with the kidney shaped passage 40 extending therethrough by forming an extrusion, indicated at 88 in FIG. 5, having a cross-sectional configuration conforming to the cross-sectional configuration of the cutting tip 12. The extrusion 88 is formed in a known manner by using a die 92 having an opening of the same configuration as the exterior surface 46 of the cutting tip 12. A mandrel 94, having a cross-sectional configuration conforming to the configuration of the surface of the passage 40, extends through the opening in the die 92. A ram 96 is moved to the right, as viewed in FIG. 4, to force material outwardly between the die 92 and mandrel 94. As will be apparent to those skilled in the art, the resulting extrusion 88 has a cross-sectional configuration which is the same as the configuration of the cutting tip 12. The relatively long extrusion 88 is cut into segments of a length corresponding to the overall length of the cutting tip 12.

Although the cutting tip 12 can be formed of many different materials, in a preferred embodiment of the invention the cutting tip is formed of tungsten carbide. The use of tungsten carbide for the cutting tip provides excellent cutting characteristics and a relatively strong tip for a given wall thickness. The tungsten carbide tip is advantageously formed by extruding a mixture, indicated at 98 in FIG. 5, including powdered carbon, cobalt and tungsten. The readily shaped mixture is then sintered, in a known manner, to provide a strong durable tungsten carbide cutting tip which is connected to the body 20 of the gun drill in any desired manner.

In view of the foregoing description, it can be seen that I have provided an extruded tungsten carbide cutting tip 12 having a relatively large noncircular passage 40 therethrough for conducting cutting fluid to the leading end of the gun drill 10. The passage 40 has a cross-sectional configuration which is somewhat similar to the cross-sectional configuration of the cutting tip 12 to enable the passage to have a relatively large cross-sectional area, to maximize the flow of fluid therethrough, while maintaining relatively thick walls between the exterior surface of the cutting tip and the passage. If the passage 40 was formed with a circular configuration and the same cross-sectional area, the walls of the cutting tip would be relatively thin and would have poor strength characteristics. Accordingly, it has been found to be advantageous to provide the passage 40 with a cross-sectional area which is at least one and a half times as large as the area of a circle having a diameter equal to the width 60 of the passage 40. Although a preferred embodiment of the passage 40 has been illustrated in the drawings in connection with a tungsten carbide cutting tip 12, it is contemplated that extruded cutting tips having different exterior surface configurations and different cutting fluid passage configurations could be extruded in accordance with the present disclosure.

What I claim is:

1. A drill comprising an elongated body having a longitudinally extending flute for facilitating the removal of pieces of material from a hole cut in a workpiece by said drill, a first passageway formed internally in said body and extending longitudinally thereof for conducting fluid, an extruded cutting tip formed of a powdered metal which is substantially harder than the material forming said body and connected to one end of said body, said extruded cutting tip having an arcuate outer surface and a longitudinally extending flute disposed on the outer surface thereof and contiguous to said arcuate outer surface and forming a continuation of said longitudinally extending flute on said elongated body, and a second passageway extending longitudinally through the interior of said extruded cutting tip and forming a continuation of said first passageway to the leading end of said extruded cutting tip, said second passageway being defined by first and second spaced apart longitudinally extending arcuate surfaces disposed concentric with said arcuate outer surface of said extruded cutting tip and third and fourth end surfaces which interconnect said first and second concentric arcuate surfaces and which are contiguous therewith, said first and second longitudinally extending concentric arcuate surfaces and said third and fourth end surfaces defining said second passageway such that said second passageway has a noncircular elongate arcuate cross-sectional configuration which is substantially uniform along the length thereof, said second passageway having a cross-sectional area which is no greater than the cross-sectional area of said first passageway, said cross-sectional area of said second passageway being more than one-and-a-half times as great as the area of a circle having a diameter equal to the width as measured radially of said cross-sectional area of said second passageway to thereby enable fluid to flow freely through said first and second passageways to the leading end of said cutting tip, said second passageway having a maximum width as measured radially of no greater than 40% of the maximum transverse outer dimension of said extruded cutting tip, and no less than 8% of the maximum transverse outer dimension of said extruded cutting tip, said first and second concentric surfaces having an angular extent of from 50 to 110 degrees, and said elongated cross-sectional area of said second passageway having an arcuate centerline which is disposed substantially equi-distant between said arcuate outer surface of said extruded cutting tip and the center of said arcuate outer surface.

2. A drill comprising an elongated body having a longitudinally extending flute for facilitating the removal of pieces of material from a hole cut in a workpiece by said drill, a first passageway formed internally in said body and extending longitudinally thereof for conducting fluid, said first passageway having a noncircular cross-sectional configuration, an extruded cutting tip formed of a powdered metal which is substantially harder than the material forming said body and connected to one end of said body, said extruded cutting tip having an arcuate outer surface and a longitudinally extending flute disposed on the outer surface thereof and contiguous to said arcuate outer surface and forming a continuation of said longitudinally extending flute on said elongated body, said arcuate outer surface of said cutting tip extending approximately 250 degrees around the circumference of said cutting tip, and a second passageway extending longitudinally through the interior of said extruded cutting tip and forming a continuation of said first passageway to the leading end of said extruded cutting tip, said second passageway having a uniform noncircular elongated cross-sectional configuration and a cross-sectional area which is no greater than the cross-sectional area of said first passageway, said cross-sectional area of the second passageway being shaped to overlie at least a portion of said cross-sectional area of said first passageway, said cross-sectional area of said second passageway being more than one-and-a-half times as great as the area of a circle having a diameter equal to the width as measured radially of said cross-sectional area of said second passageway to thereby enable fluid to flow freely through said first and second passageways to said leading end of said cutting tip, said second passageway having a maximum width as measured radially no greater than 40% of the maximum transverse outer dimension of said cutting tip, and no less than 8% of the maximum transverse outer dimension of said extruded tip, said noncircular elongate cross-sectional area of said second passageway having an angular extent of approximately from 50 to 110 degrees and lying at least in part on opposite sides of a line through the center of the arcuate outer surface of the cutting tip and dissecting same.

3. A drill as defined in claim 2 wherein said second passageway is defined by first and second arcuate surfaces concentric with the arcuate outer surface of the cutting tip and by third and fourth end surfaces which interconnect said third and fourth surfaces, and said elongate cross-sectional area of said second passageway having an arcuate centerline which is disposed substantially equidistant between said arcuate outer surface of said extruded cutting tip and the center of said arcuate outer surface.

4. A drill as defined in claim 3 wherein said cross-sectional area of said second passageway is located with equal portions thereof on opposite sides of said lines.

References Cited

UNITED STATES PATENTS

| | | | |
|---|---|---|---|
| 841,184 | 1/1907 | Roeske | 77—68 |
| 2,271,960 | 2/1942 | Taylor | 77—70UX |
| 2,325,535 | 7/1943 | Nordberg | 76—108 |

FRANCIS S. HUSAR, Primary Examiner